Feb. 14, 1928. 1,659,044
A. NELSON
ANTISKID CHAIN FOR AUTOMOBILES
Filed Feb. 25, 1924
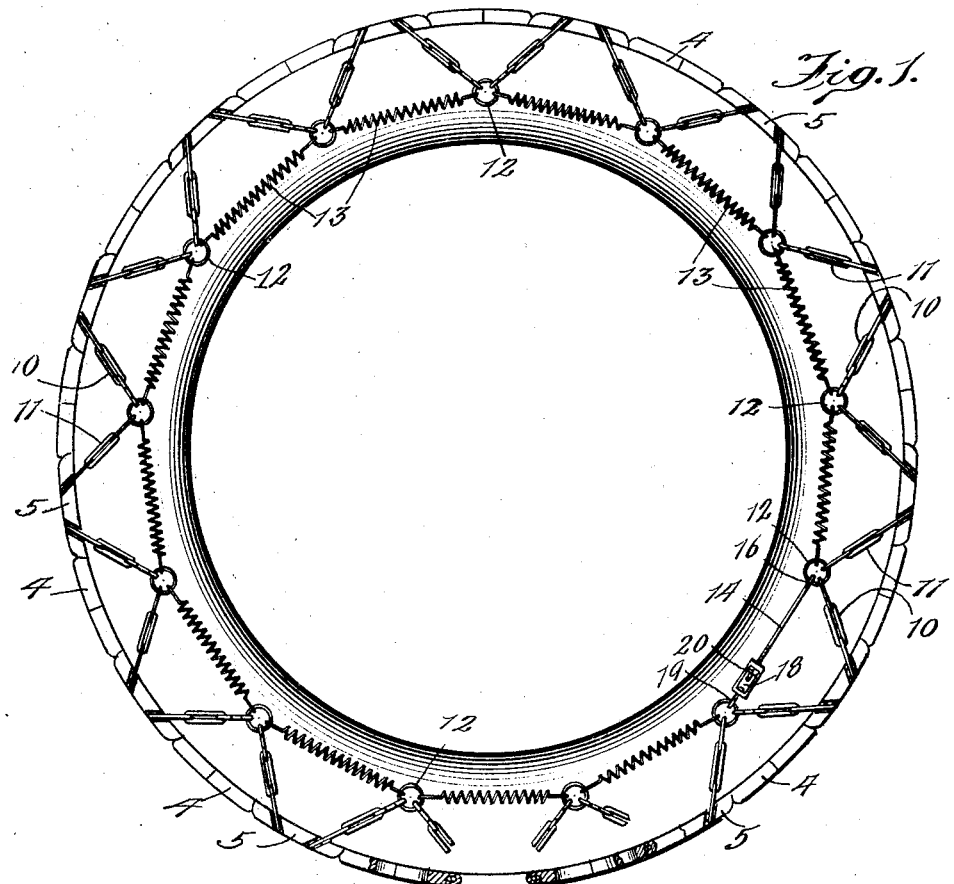
*Fig. 1.*
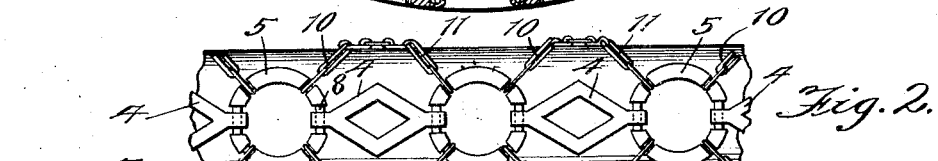
*Fig. 2.*
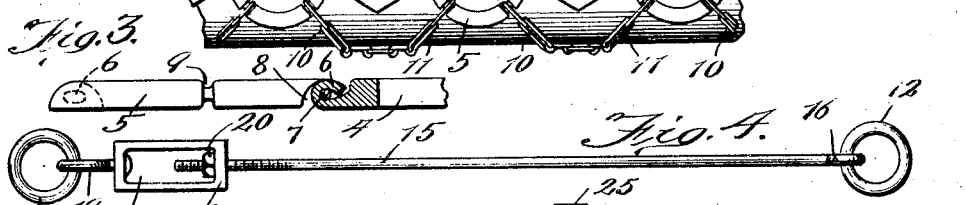
*Fig. 3.* *Fig. 4.*
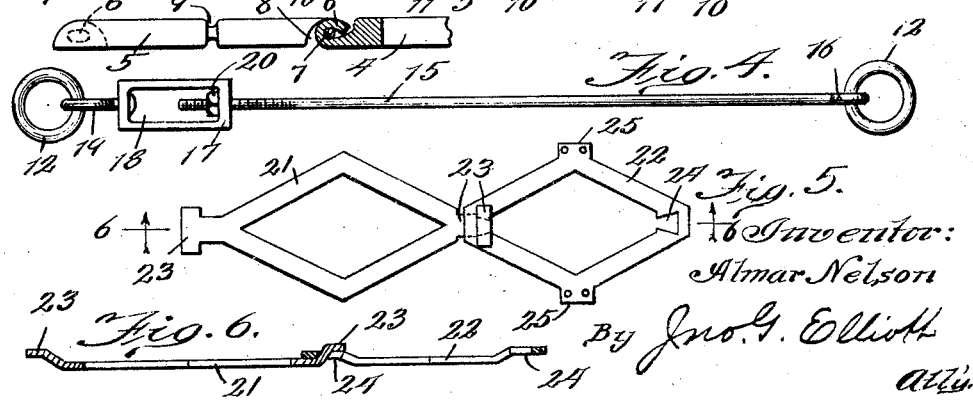
*Fig. 5.*
*Fig. 6.*
Inventor:
Almar Nelson
By Jno. G. Elliott
atty.

Patented Feb. 14, 1928.

1,659,044

UNITED STATES PATENT OFFICE.

ALMAR NELSON, OF CHICAGO, ILLINOIS.

ANTISKID CHAIN FOR AUTOMOBILES.

Application filed February 25, 1924. Serial No. 694,980.

This invention relates to improvements in anti-skid chains in automobiles, adapted to creep on the tire casings and heretofore consisting in their entirety of a netting of wire links mounted upon the tire casings and which are subject to the objection that on striking obstructions in a roadway, one or more of the links frequently break, with the result that the chain strikes against the running board and produces so much noise therefrom that immediate repairs are required.

The object of my invention is an anti-skid chain, the construction of which is such that the creeping of the chain on the tire casing, if any, is reduced to a minimum, and that, on striking an obstruction, the chain will yield to the force of its impact and immediately afterward resume its normal position on the casing.

A further object of my invention is an anti-skid chain, the tread links of which are connected with the yielding devices for the purposes above described, which is provided with means adapted for adjusting the chain in its operative position against accidental detachment from the casing, and which at the same time provides for the tread of the chain temporarily yielding to impact, followed by resuming a normal position with reference to the casing.

With these ends in view, my invention finds embodiment in certain features of novelty in the construction, combination and arrangement of parts by which the said objects and certain other objects are attained, all as hereinafter fully described with reference to the accompanying drawings and more fully pointed out in the claim.

In said drawing,—

Fig. 1 illustrates, in side elevation, an anti-skid chain in which my invention finds embodiment.

Fig. 2 is a plan view of a portion of the same.

Fig. 3 is a side elevation of the tread partly in section.

Fig. 4 is an enlarged view of a turnbuckle construction adapted for retaining the chain as a whole in its operative position on the tire casing.

Fig. 5 is a plan view of a modified form of the construction and arrangement of the tread plates, and Fig. 6 is a longitudinal section taken on the line 6—6 of Fig. 5.

Similar characters of reference indicate the same parts in the several figures of the drawing.

The tread portion of my chain consists of a number of flat metal plates pivotally connected in the same plane at their adjacent ends, which plates, as shown in the drawings, preferably have alternately the form of diamond-shaped plates 4 and flat rings 5, the diamond-shaped plates 4 being provided at their opposite ends with clips adapted to be bent to form an eye 6 surrounding pivots 7, formed in the rings 5 by cutting a circumferential groove 8 in the rings 5, so that the surfaces of the adjacent ends of the links of the plates lie in the same plane.

Ring plates 5 are further provided at suitable intervals with cut-away portions 9 for the connection of chains 10 and 11 at the opposite sides of the tread plates, which chains 10 and 11 converge with reference to each other and are connected with a ring 12, located adjacent the side surfaces of the casing shown in the drawing, said rings being connected by spiral springs 13 normally adapted to secure the tread of the chain in its operative position for providing the tread of the chain with means by which it is adapted to yield to the force imparted by impact with an obstruction in a roadway, and for immediately thereafter returning the tread to its normal position.

In order to provide the springs with means for taking up lost tension and also for maintaining the tread plates in their operative position, as above described, one or more turnbuckles 14 may be substituted for one or more of the coiled springs for connecting the rings 12, as is clearly shown in Fig. 1, which turnbuckle, as shown in Fig. 4, is provided with a rod 15, in which, at one end, an eye 16 is formed for securing it to one of the rings 12, the opposite end of which is screwthreaded and project through a bearing 17 formed on a plate 18, in turn provided with an eye 19, the adjustment of the rod 15 being by means of a nut 20.

From the foregoing, it will now be apparent that by employing flat tread plates, the opposing ends of which are so articulated that there will be no projections therefrom tending to catch upon obstructions in a roadway, and that the force of impact therefrom will be distributed over several of the tread plates, and thereby relieving their pivotal connections from strains and forces otherwise tending to injure or break them.

It will also be apparent that by the connection of the tread plates through the converging open link chains 10 and 11 with the ring, and these rings in turn by the coiled springs, said springs not only tend to maintain the structure as a whole in its operative position, but provide a means by which a substantial and material creeping of the chain on the tire is prevented, and shocks to the tread of the chain are taken up and absorbed by the springs; that after the device as a whole has been adjusted to its operative position on a tire casing, for preventing the tread plates from creeping, the loose link chains connecting the spring and the tread plates provide for its quick removal and replacement without changing such adjustment or deflating the tire, and this in the absence of any necessity for inserting a packing of any kind between the tread plates and the casing for the protection of the latter from wear, and that such device, including the coiled springs, is located within the confines of the tire casing, instead of inwardly beyond the felly of an automobile wheel.

For the purposes of my invention, the turnbuckle need not be used until it is desired to take up the lost tension of the springs, for, even in the absence of the turnbuckle, the springs are adapted to maintain the entire structure of my invention, and particularly the tread portion thereof, against accidental detachment from the casing.

In Figs. 5 and 6 is illustrated a modified form and construction of the tread plates in which all of them consist of diamond-shaped plates 21 and 22, struck from sheet metal, the plate 21 with a T-shaped tenon 23 at each end, adapted to be detachably interlocked with mortises 24 at the opposite ends of the plate 22, which latter is provided with lugs 25 for the connection of the links 10 and 11.

The tenons 23 project upwardly, as shown in Fig. 6, in order that when connected the plates 21 and 22 will occupy the same plane, which plates, if need be, may be slightly curved outwardly to conform to the curved surface of the outer casing.

The form and construction of the plates shown in Figs. 5 and 6 have all of the advantages of tread plates alternately round and diamond-shaped and, in addition thereto, are apparently of cheaper construction than are the rings 5 shown in Fig. 2, for the reason that they are producible by stamping, and, besides, are so connected that when in their operative position on a tire casing, tightened, as they are thereon, they are not liable to accidental detachment.

In conclusion, it is to be observed that the use of yielding flat tread plates provided for by my invention, momentarily yielding to the force of impact imparted by abrupt obstructions, without possible injury to either the tread or the chain, as distinguished from a chain constructed in its entirety of wire links creeping upon the tread, is apparently a substantial and material improvement in the art.

Having described my invention, what I claim and desire to secure by Letters Patent is:

In an antiskid device, a plurality of tread plates, rings connecting adjacent plates, a circular series of connected springs and a pair of chains on adjacent rings having a common connection to said series of springs.

In witness whereof, I have hereunto set my hand this 13th day of February, 1924.

ALMAR NELSON.